(12) United States Patent
Chen et al.

(10) Patent No.: US 7,953,586 B2
(45) Date of Patent: May 31, 2011

(54) METHOD AND SYSTEM FOR DESIGNING BOTTOM HOLE ASSEMBLY CONFIGURATION

(75) Inventors: Chenkang D. Chen, Houston, TX (US); Min Wu, Tomball, TX (US); Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 936 days.

(21) Appl. No.: 11/780,750

(22) Filed: Jul. 20, 2007

(65) Prior Publication Data

US 2008/0230272 A1 Sep. 25, 2008

Related U.S. Application Data

(60) Provisional application No. 60/820,048, filed on Jul. 21, 2006.

(51) Int. Cl.
  *G06F 7/60* (2006.01)
  *G06G 7/48* (2006.01)
  *E21B 25/16* (2006.01)
(52) U.S. Cl. ................ 703/10; 703/2; 175/45
(58) Field of Classification Search ............... 703/2, 10; 175/45
See application file for complete search history.

(56) References Cited

U.S. PATENT DOCUMENTS

| | | | | |
|---|---|---|---|---|
| 4,804,051 A | * | 2/1989 | Ho | 175/26 |
| 5,141,060 A | | 8/1992 | Jogi | |
| 5,465,799 A | * | 11/1995 | Ho | 175/61 |
| 5,608,162 A | * | 3/1997 | Ho | 73/152.48 |
| 7,147,066 B2 | * | 12/2006 | Chen et al. | 175/61 |
| 7,621,343 B2 | * | 11/2009 | Chen et al. | 175/61 |
| 2004/0221985 A1 | | 11/2004 | Hill et al. | |
| 2009/0090555 A1 | * | 4/2009 | Boone et al. | 175/45 |
| 2009/0090556 A1 | * | 4/2009 | Chen | 175/45 |

OTHER PUBLICATIONS

"An Empirical Approach for Relating Drilling Parameters", Cunningham, et al. Journal of Petroleum Technology. Jul. 1978.*
"Prediction of Wellbore Trajectory Considering Bottomhole Assembly and Drill-Bit Dynamics". Brakel, et al. SPE Drilling Engineering. Jun. 1989.*
Wu, et al., "A Generic Solution to Bottomhole-Assembly Modeling," 2006 SPE Annual Technical Conference and Exhibition, Sep. 2006, pp. 1-9, SPE 101186 Society of Petroleum Engineers, San Antonio, Texas, USA.
Callas, et al., "Boundary Value Problem is Solved," Oil and Gas Journal, Dec. 15, 1980, pp. 62-66, Penwell Petroleum Group, USA.

* cited by examiner

*Primary Examiner* — Jason Proctor
*Assistant Examiner* — Nithya Janakiraman
(74) *Attorney, Agent, or Firm* — Conley Rose, P.C.

(57) ABSTRACT

A method and system for designing bottom hole assembly configuration. The system and method include modeling the bottom hole assembly by dividing complicated BHA configurations into independent modules and segments. Modules are bounded by two stabilizers where segments are bounded by bottom hole assembly components. A recursive process is used to derive solutions for each of the segments and modules. Only two unknowns (and two non-linear equations) are left when the recursive process reaches to the bit. The two unknowns are then solved by iteration.

15 Claims, 6 Drawing Sheets

METHOD AND SYSTEM FOR DESIGNING BOTTOM HOLE ASSEMBLY CONFIGURATION

CROSS-REFERENCE TO RELATED APPLICATIONS

This application claims the benefit of U.S. Provisional Application No. 60/820,048, filed Jul. 21, 2006, and entitled Method and System for Designing Bottom Hole Assembly Configuration, hereby incorporated herein by reference.

STATEMENT REGARDING FEDERALLY SPONSORED RESEARCH OR DEVELOPMENT

Not Applicable

BACKGROUND

Wellbores are formed by rotating a drill bit carried at an end of an assembly commonly referred to as a bottom hole assembly or "BHA." Herein, the BHA is used to mean the bottom hole assembly with or without the drill bit. The BHA is conveyed into the wellbore by a drill pipe or coiled-tubing. The rotation of the drill bit is effected by rotating the drill pipe and/or by a mud motor depending upon the tubing used. BHAs generally may include one or more formation evaluation sensors, such as sensors for measuring the resistivity, porosity, and density of the formation. Such BHAs may also include devices to determine the BHA inclination and azimuth, pressure sensors, vibration sensors, temperature sensors, gamma ray devices, and devices that aid in orienting the drill bit a particular direction and to change the drilling direction, Acoustic and resistivity devices may also be included for determining bed boundaries around and in some cases in front of the drill bit.

In practice, the BHAs are manufactured for specific applications and each such version usually contains only a selected number of devices and sensors. Additionally, BHAs may have limited data processing capabilities and do not compute the parameters downhole that can be used to control the drilling operations. Instead, BHAs may transmit data or partial answers uphole via a relatively small data-rate telemetry system. The drilling decisions are made at the surface based on the information provided by the BHA, data gathered during drilling of prior wellbores, and geophysical or seismic maps of the field. Drilling parameters, such as the weight-on-bit, drilling fluid flow rate, and drill bit RPM are usually measured and controlled at the surface.

The operating or useful life of the drill bit, mud motor, bearing assembly, and other elements of the BHA depends upon the manner in which such devices are operated and the down-hole conditions. This includes rock type and drilling conditions such as pressure, temperature, differential pressure across the mud motor, rotational speed, torque, vibration, drilling fluid flow rate, force on the drill bit or the weight-on-bit ("WOB"), type of the drilling fluid used, and the condition of the radial and axial bearings.

If any of the essential BHA components fails or, becomes relatively ineffective, the drilling operation must be shut down to pull out the drill string from the borehole to replace or repair such a component. Such premature failures can significantly increase the drilling cost Additionally, BHAs that contain multiple components must be designed to optimize drilling performance, especially with regards to directional drilling where the borehole is curved either using a steerable motor system, a point-the-bit rotary steerable system, or other type of directional drilling system. Parameters such as directional drilling ability and performance, location of stabilizers, BHA sag, as well as others are considered in the design of the placement of the various components of a BHA.

Modeling may also be used to optimize the design of the BHA, especially in directional drilling. BHA modeling enables many critical applications such as: (1) designing a BHA to optimize directional performance; (2) optimizing stabilizer locations to minimize vibration and increase downhole tool reliability; and (3) improving survey data by correcting the BHA sag, etc. However, there are many challenges in developing a computationally efficient, flexible, and accurate BHA model, including: (1) nonlinear differential equations; (2) unknown upper boundary conditions at the tangential point (location and orientation); (3) unknown boundary conditions at stabilizers; (4) collars and wellbore wall contacts; and (5) large deformation caused by the bent housing motor or the bend in rotary steerable tools, etc.

Figure 1:
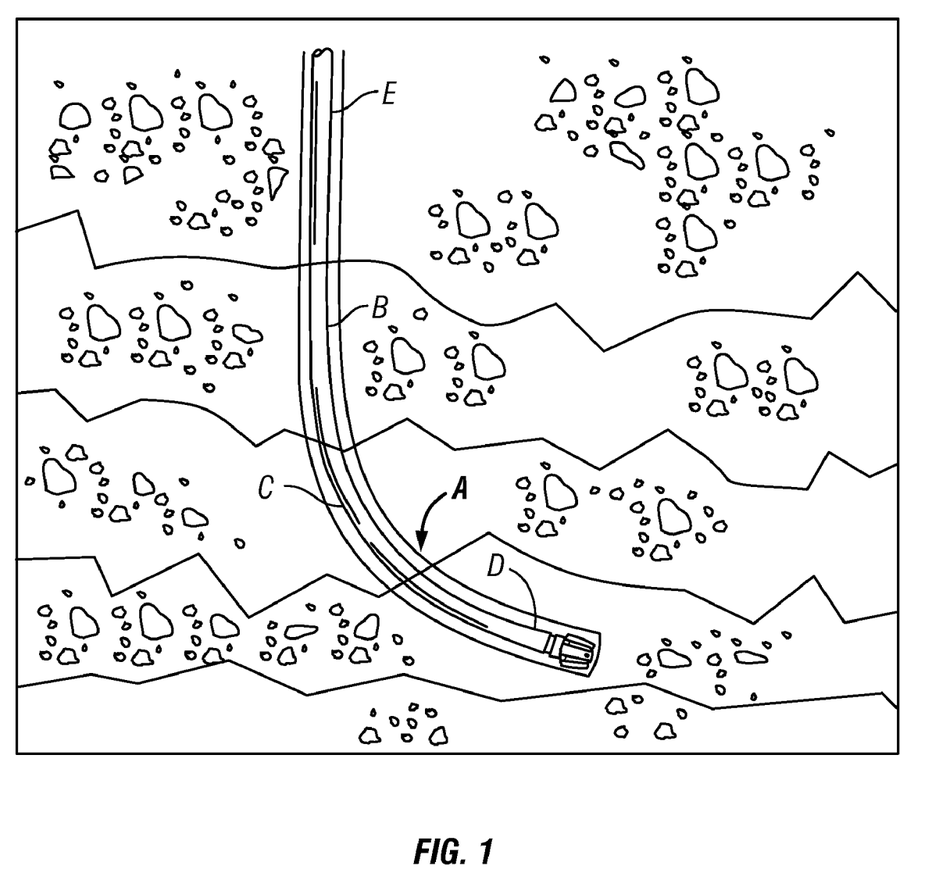
FIG. 1 is a schematic of a directional wellbore.

FIG. 1 illustrates a directional well with a lateral borehole A drilled using a drillstring E with a drill bit at its distal end. The kick-off point B is the beginning of the build section C. A build section may be performed at a planned build-tip rate until the desired angle or end-of-build D is achieved. The build-up rate is normally expressed in terms of degrees-per-hundred-feet (deg/100'), which is simply the measured change in angle divided by the measured depth drilled. The build rate, or angle-changing capability of a motor or a rotary steerable system, depends on the extent to which the combination of bend and stabilizers and/or pads cause the bit to be offset from the center line of a straight borehole. Increased bit offset results in higher build rate. Increased bit offset, however, results in increased side loads when kicking off the borehole wall or when the motor is rotated in the borehole. High bit side loads can cause damage to the gage or bearings of the bit, and limit motor life by causing driveshaft fatigue, radial bearing wear, and stator damage. Stabilizer loads and associated wear also increase.

BHA modeling is used to analyze forces on the bit and stabilizers and bending stresses at connections and critical cross-section changes, with assemblies oriented in the model both highside and lowside. BHA modeling is also used in well planning for predicting the capabilities and tendencies of each BHA that is planned to be run. BHA modeling identifies the response of each BHA to variation in operating parameters such as weight on bit, overgage or undergage hole, stabilizer wear, and formation tendencies.

Various types of directional BHA models exist, as are well known by one skilled in the art. Two kinds of models are commonly used, the finite-element method and the semi-analytical method. Many BHA models using the finite-element analysis method are based on the small deformation theory. Thus, they have been shown to be not accurate enough to model steerable assemblies such as motor or rotary steerable systems. Finite-element modeling is also cumbersome in handling the collars and wellbore contact. To accurately model steerable systems, the semi-analytical methods are usually required; but semi-analytical methods may be inflexible. They are often designed to analyze some specific BHA models and are often limited to BHA with rather simple configurations.

The general solution, developed by Arthur Lubinski in the 1950's, to solve for the continuous beam-column model (fourth-order nonlinear differential equations) can be expressed in the form of:

$$x(z) = P_1 + P_2 \times \cos\left(\sqrt{\frac{W}{EI}}\,z\right) + P_3 \times \sin\left(\sqrt{\frac{W}{EI}}\,z\right) + \frac{H'}{W}z + \frac{q\sin\alpha}{2W} \times z^2 \quad (1)$$

In which $P_1$, $P_2$, and $P_3$ are three variables H' is the "normalized" side force acting on the left hand side of the segment, W is the weight-on-bit; q is the unit weight of the drill string and α is the inclination angle. Thus, for each segment in the BHA model, there are four unknowns: $P_1$, $P_2$, $P_3$ and H'. Note $P_1$, $P_2$, and $P_3$ are called the segment profiles in this paper.

A BHA model usually consists of components such as a drill hit, stabilizers, cross-overs, bends, and offset pads, etc. For a BHA with N components, there will be (N+1) sections in the model. The last section in the model is bounded by the top component and the tangential point where the collars are in contact with the wellbore wall hi each section, there will be four unknowns as solved by using Lubinski's BHA equations. Thus, for an N-component BHA, there are "approximately" 4×(N+1) unknowns associated with 4×(N+1) non-linear equations in the model.

Deriving the 4×(N+1) non-linear equations or even iterating 4×(N+1) unknowns is extremely difficult, especially when N becomes large. For example, a typical BHA with 2-3 stabilizers, 3-4 cross-over, and one bend will have an N of at least 6. Thus, there are approximately 28 non-linear equations to be derived and 28 unknowns to be solved. There are two main challenges to be overcome when using the closed-form solutions such as Lubinski's equations: (1) to find a process to construct the model dynamically; and (2) to reduce the unknowns to a manageable number for iteration.

BRIEF DESCRIPTION OF THE DRAWINGS

For a more detailed description of the embodiments, reference will now be made to the following accompanying drawings.

DETAILED DESCRIPTION OF THE EMBODIMENTS

In the drawings and description that follows, like parts are marked throughout the specification and drawings with the same reference numerals, respectively. The drawing figures are not necessarily to scale. Certain features may be shown exaggerated in scale or in somewhat schematic form and some details of conventional elements may not be shown in the interest of clarity and conciseness. Specific embodiments are described in detail and are shown in the drawings, with the understanding that the present disclosure is to be considered an exemplification, and is not intended to limit the invention to that illustrated and described herein. It is to be fully recognized that the different teachings of the embodiments discussed below may be employed separately or in any suitable combination to produce desired results. As used herein, the use of the terms "upper" or "lower" are in reference to the direction of the borehole at any given time and not relative to the surface of the earth. For example, the borehole may be flat but yet the portion of a bottom hole assembly closest to the end of the borehole will be the "lower" portion while the portion of the bottom hole assembly furthest away from the end of the borehole will be the "upper" portion, despite the fact that neither one is higher or lower than the other relative to the surface of the earth. Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

As illustrated in FIGS. 2-5, a BHA model may be used for BHA configuration design and implementation for assembling the BHA for use in drilling a wellbore. A BHA program with the capability to model BHA configuration may also be used. In addition, the model may be expanded to model special drilling tools. The modeling program is computationally efficient as well as easy to run with an intuitive user-interface. The model may be run on a computer system that includes a processor, and a computer-readable medium. The computer-readable medium includes software that, when executed by the processor causes the processor to perform the process of modeling and configuring a BHA. The computer-readable medium is understood to include volatile memory (e.g., random access memory), non-volatile storage (e.g., hard disk drive, Flash memory, read-only memory, compact disk read-only memory (CD ROM), etc.), or combinations thereof. The computer-readable medium may be located on user's computer or accessible through an electronic network, such as the Internet, or even available by communication via satellite.

In general, the bottom hole assembly configuration is modeled using Lubinski's bottom hole assembly equations such that the bottom hole assembly model is characterized by two nonlinear equations associated with two unknowns. The unknowns are then resolved by iteration to obtain a modeled bottom hole assembly configuration. The results of the modeled bottom hole assembly may then be displayed for the user to use in assembling a bottom hole assembly.

The followings are general assumption used in modeling the BHA:

(1) The BHA is modeled in 2D;
(2) The drill string components behave elastically;
(3) The bit is centered in the wellbore;
(4) Dynamic effects from drill strings and fluids are ignored; and
(5) There is at least one stabilizer in the BHA.

The following nomenclature will be used throughout the equations:

N: total number of the BHA components
M: total number of the stabilizers
K: total number of the cross-overs
J: total number of the bends
$\{P_n(3)\}$: segment profiles, n=0 ... N
$l_i$: cross-over distance from the bit, i=1 ... K $g_i$: equivalent weight of the drill collar, i=0 . . . K
$\xi_i$: weighted stiffness factor of the drill collar, i=0 . . . K $$\xi_i = \sqrt{\frac{W}{EI_i}}$$

$\{E_i(2)\}$: cross-over coefficient, i=1 . . . K
$\{F_i(2,2)\}$: cross-over coefficient, i=1 . . . K
$XE_i$: cross-over coefficient, i=1 . . . K
$D_i$: stabilizer radial clearance, i=1 . . . M
$d_i$: stabilizer distance from the bit, i=1 . . . M
$H'_i$: normalized side force of the stabilizer; i=1 . . . M
$\theta_i$: bend angle, i=1 . . . J
$b_i$: bend distance from the bit, i=1 . . . J
W: weight on bit
R: radius of curvature of the trajectory of the borehole
B: radial hole clearance
L: wellbore tangent point distance Divide the BHA Configuration into "Segments" and "Modules"

Figure 2:
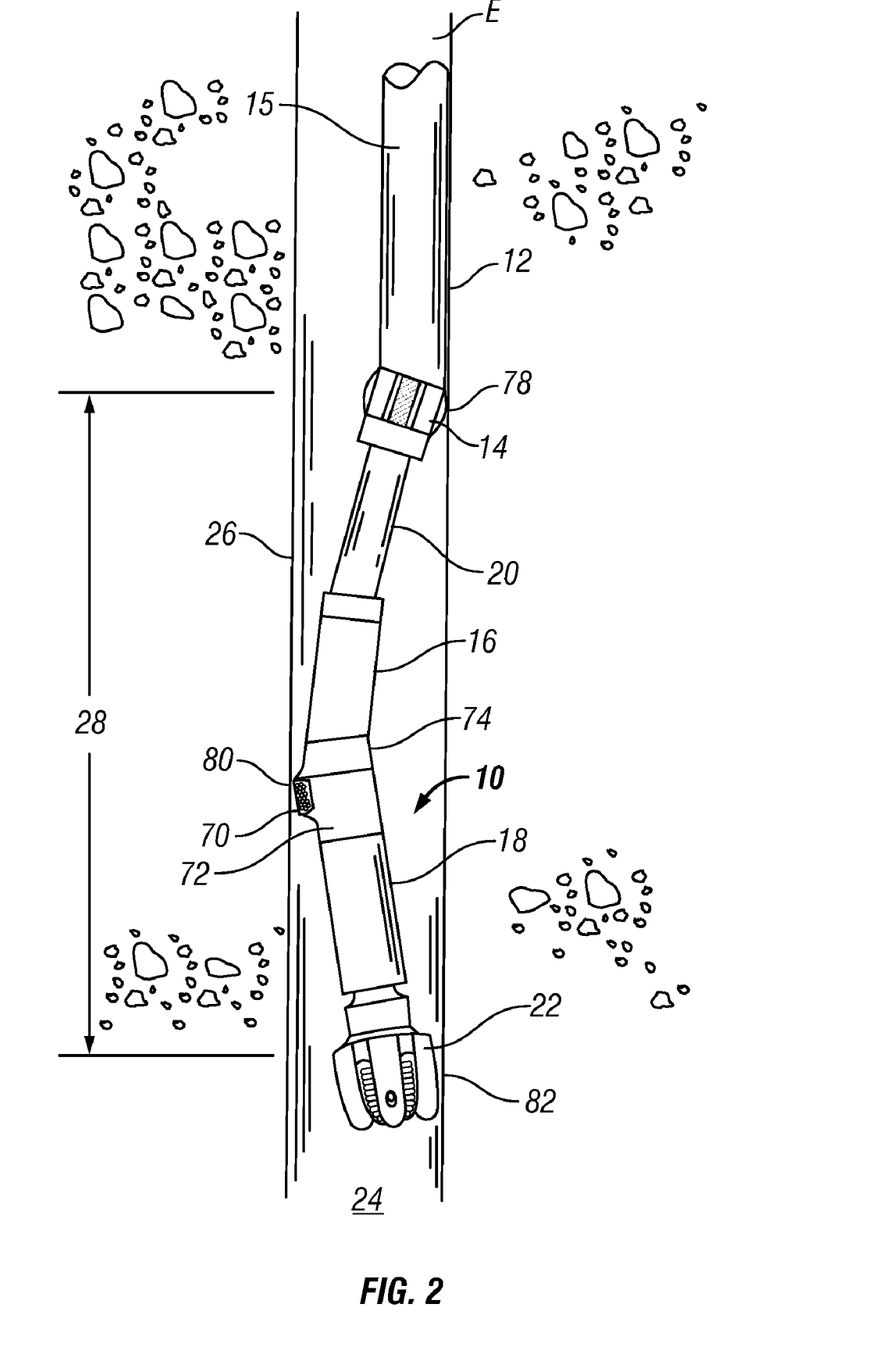
FIG. 2 is a schematic of an example BHA used to drill a directional wellbore such as the example of FIG. 1.

Modeling the BHA includes dividing the BHA configuration into "segments" and "modules." A BHA may typically include a drill bit, stabilizers, cross-overs, bends, and offset pads, etc., which the BHA model is able to account for when modeling the BHA. The BHA model may also take into account telemetry systems for communicating data with equipment on the surface. As illustrated in FIG. 2, a BHA 10 may include a drill bit 22 driven by a positive displacement drilling motor 12 having a tubular housing comprised of a plurality of sections or individual housings, e.g., components. For example, the components may include, a dump valve section or housing (not shown), at least one power generation section or housing 15, a flexible section or housing 20, a connector rod section or housing 16 typically referred as the bent housing, and a bearing section or housing 18. It should be appreciated that two or more of these sections or housings may be an integral part. The power generation section 15 may include a stator 36 in which is disposed a rotor 54. A stabilizer 14 is also disposed oil bottom hole assembly 10. In FIG. 2, the BHA 10 is shown passing through the bore hole 24 of casing 26 with bent housing 16 forming a bend 74. The distance 28 between the stabilizer 14 and bit 22 is selected based on the desired build rate and formation anisotropy. The shorter that distance the greater the build-up rate. It should be appreciated, however, that the BHA 10 is only an example and that completely different components to those shown in FIG. 2 may also be modeled.

The general solution to solve for the continuous beam-column model (fourth-order nonlinear differential equations) can be expressed in the form of:

$$x(z) = P_1 + P_2 \times \cos\left(\sqrt{\frac{W}{EI}} z\right) + P_3 \times \sin\left(\sqrt{\frac{W}{EI}} z\right) + \frac{H'}{W} z + \frac{q \sin\alpha}{2W} \times z^2 \quad (1)$$

In which $P_1$, $P_2$, and $P_3$ are three variables H' is the "normalized" side force acting on the left hand side of the segment, W is the weight-on-bit; q is the unit weight of the drill string and $\alpha$ is the inclination angle. Thus, for each segment in the BHA model, there are four unknowns: $P_1$, $P_2$, $P_3$ and H', $P_1$, $P_2$, and $P_3$ are segment profiles.

Figure 3:
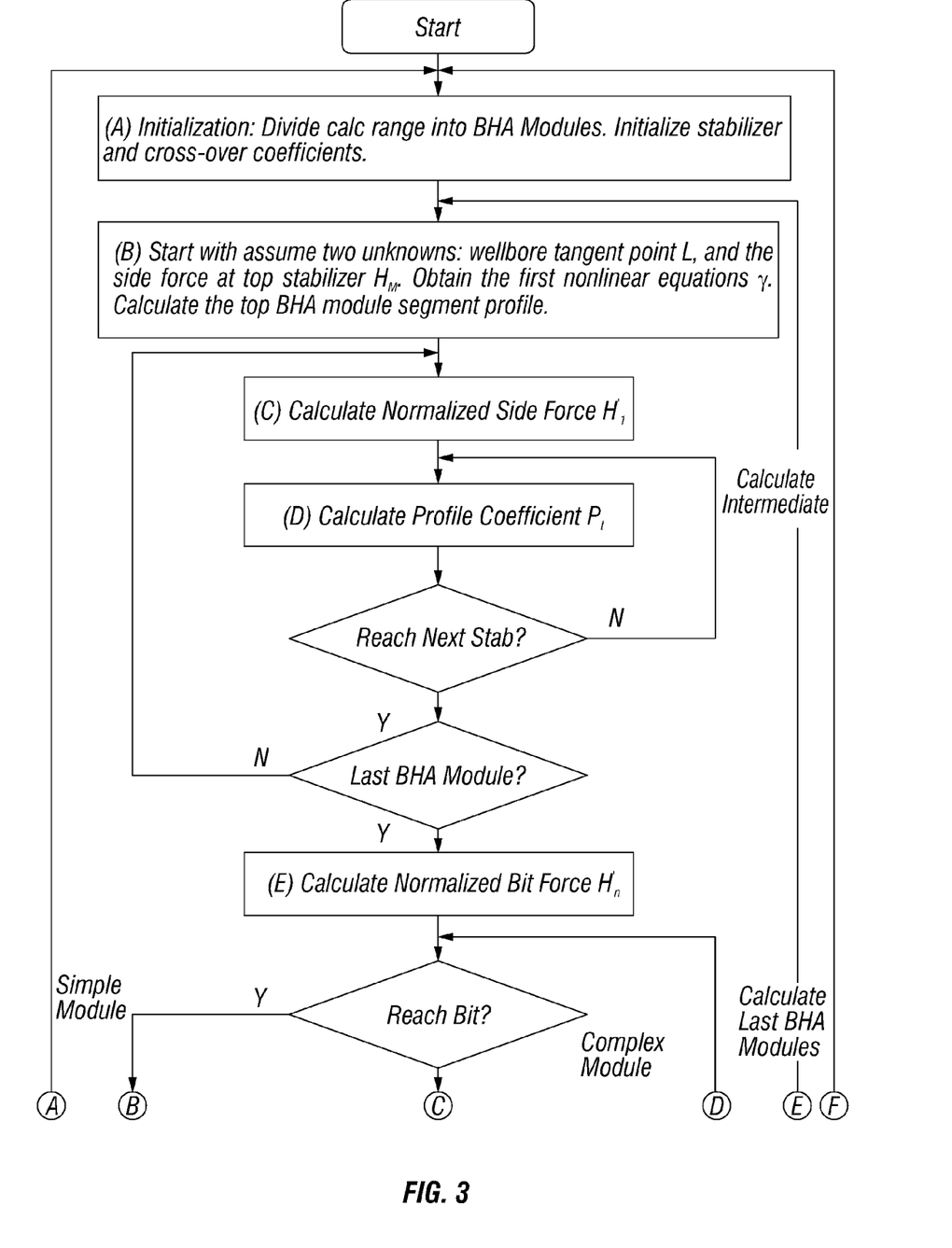
FIG. 3 is a calculation flow chart for modeling the layout of a BHA.

FIG. 3 illustrates an example flow chart for modeling a BHA, which may consist of the followings components: a drill bit, stabilizers (or offset pad abbreviated as "S"), cross-overs ("X"), and bends ("B"). Thus, the BHA model can be broken down into a series of "S", "X", and "B" components. The example in FIG. 4 illustrates a BHA model with four stabilizers, one bend and eight cross-overs, which is defined as "Bit-XXSXXBXXSXXS-L."

The modeling process is designed to "self-structure" the BHA model. To model the BHA using Lubinski's equations, a BHA configuration is divided into independent modules and segments. The goal is to divide the BHA model into a series of independent units that can be transformed from one to the other. These modules may also serve as building blocks to build and then dissect any BHA with no restriction. For purposes of the model, "modules" are defined as sections of BHA bounded by two stabilizers (S-S module), by the lowest stabilizer and the bit (the Bit module), and by the top stabilizer and the tangential point (the Tangent module). The BHA configuration must have at least one module. For purposes of this disclosure, "segments" are defined as sections between any two BHA components such as "S", "X", "B", as well as the bit and the tangential point. A segment is the smallest computational unit and a module can compose one segment such as "S-S", or several segments.

Figure 4:
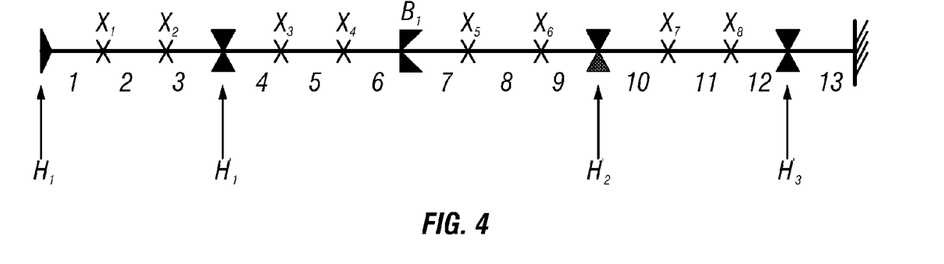
FIG. 4 is a schematic of an example modeled BHA using the flow chart illustrated in FIG. 3.

For the example in FIG. 4, there are four modules in the BHA model "Bit-XXSXXBXXSXXS-L": "Bit-X-S", "S-X-X-B-X-X-S", "S-X-X-S", and "S-Tangential point (L)." There are 13 segments in this BHA model (N=13). The 13 segments starting from the bit and to the tangential point are: "Bit-X", "X-X", "X-S", "S-X", "X-X", "X-B", "B-X", "X-X", "X-S", "S-X", "X-X", "X-S", and "S-Tangential Point (L)." Thus, in theory, there are "approximately" 56 unknowns associated with 56 nonlinear equations. Note also that there are eight cross-overs (K=8) and three stabilizers (M=3) in this example.

When dividing the BHA into modules, the solutions of each module are found to be functions of: (1) the components in the current module; (2) the initial segment profiles (which are the segment profiles of the last segment in the upper module); and (3) two side forces at the end stabilizers in the current module. Furthermore, one can also find that the side force of one of the stabilizers can be expressed as a function of (1) and (2) and the side force at another stabilizer. Thus, using a "recursive method", if one module in the BHA is solved, the adjacent module can be solved. The process can repeat until it reaches the end module. Thus it is possible to solve the entire BHA model by calculating each module sequentially. This method is called the "Recursive Modulation Method" (RMM).

The starting point is the top module, the "Tangent Module." By assuming two unknowns, L (the distance between the tangential point and the top stabilizer), and the side force at the top stabilizer ($H'_M$) the segment profiles of the "Tangent Module" can be obtained as shown in EQUATION (5). Note the tangential point is the first contact point between the collars and the wellbore wall. It is at an unknown distance, L, from the top stabilizer and does not necessarily lie on the low side of the wellbore in this algorithm. M is the total number of the stabilizers.

For example, if the segment profiles of the "Tangent Module" are obtained, the side force at the lower stabilizer in the adjacent module can be solved as shown in EQUATION (7). This then will enable the solutions of the segment profiles in the $2^{nd}$ module. This process will then repeat until it reaches the "Bit Module", which completes the BHA model.

To further simplify the mathematical derivation without affecting the solution, the pseudo cross-over (cross-over with equal stiffness on both ends) is inserted between component "S" and "B." Thus the "S-S" segment will be changed into two segments as "S-X" and "X-S"; the "S-B" segment will become two segments as "S-X" and "X-B." The "B-S" segment will be converted to two segments as "B-X" and "X-S." The cross-over is considered a linear transformation and can be defined by the cross-over coefficients $E_i$, $F_i$ and $XE_i$:

$$\begin{cases} E_i(0) = 2 \times \frac{g_i - g_{i-1}}{\xi_{i-1}} \times l_i \sin(\xi_{i-1} l_i) + \cos(\xi_{i-1} l_i) \times \left(\frac{g_{i-1}}{\xi_{i-1}^2} - \frac{g_i}{\xi_i^2}\right) \\ E_i(1) = -2 \times \frac{g_i - g_{i-1}}{\xi_{i-1}} \times l_i \cos(\xi_{i-1} l_i) + \sin(\xi_{i-1} l_i) \times \left(\frac{g_{i-1}}{\xi_{i-1}^2} - \frac{g_i}{\xi_i^2}\right) \end{cases} \quad (2)$$

$$\begin{cases} F_i(0, 0) = \cos(\xi_i l_i)\cos(\xi_{i-1} l_i) + \frac{\xi_{i-1}}{\xi_i} \cos(\xi_i l_i)\sin(\xi_{i-1} l_i) \\ F_i(0, 1) = \sin(\xi_i l_i)\cos(\xi_{i-1} l_i) - \frac{\xi_{i-1}}{\xi_i} \cos(\xi_i l_i)\sin(\xi_{i-1} l_i) \\ F_i(1, 0) = \cos(\xi_i l_i)\sin(\xi_{i-1} l_i) - \frac{\xi_{i-1}}{\xi_i} \sin(\xi_i l_i)\cos(\xi_{i-1} l_i) \\ F_i(1, 1) = \sin(\xi_i l_i)\sin(\xi_{i-1} l_i) + \frac{\xi_{i-1}}{\xi_i} \cos(\xi_i l_i)\cos(\xi_{i-1} l_i) \end{cases} \quad (3)$$

$$XE_i = (g_{i-1} - g_i) \times \left(\frac{2}{\xi_{i-1}^2} + l_i^2\right) - \frac{2g_i}{\xi_{i-1}^2} \times \left(\frac{\xi_{i-1}^2}{\xi_i^2} - 1\right) \quad (4)$$

Calculate the Segment Profiles in the Top Module and the First Non-Linear Equations The Recursive Modulation Method starts the process from the top module (the Tangent Module) and proceeds down to the bottom module (the Bit Module). Thus, the first module as well as the first segment to solve is the "S-Tangential Point (L)" module. The main reason to start at this module is because, given the borehole curvature and assuming the two initial unknowns, L and $H'_M$, its segment profiles can be solved as:

$$P_N(1) = B - \frac{L^2}{2R} - \frac{2g_K + 1/R}{\xi_K^2} - H'_M L - g_K L^2 \quad (5)$$

$$P_N(2) = \frac{\sin(\xi_K L) \times (H_M^- + 2g_K L + L/R)}{\xi_k} + \cos(\xi_K L) \times \frac{2g_K + 1/R}{\xi_k^2}$$

$$P_N(3) = \frac{\cos(\xi_K L) \times (H_M^+ + 2g_K L + L/R)}{\xi_k} + \sin(\xi_K L) \times \frac{2g_K + 1/R}{\xi_k^2}$$

The first non-linear equations $\gamma$, bounded by the tangential point and the top stabilizer, can be obtained as:

$$\gamma = P_N(1) - D_M + H'_M d_M + g_K d_M^2 + \quad (6)$$
$$\frac{\sin(\xi_K(L - d_M)) \times (H'_M + 2g_K L + L/R)}{\xi_K} +$$
$$\cos(\xi_K(L - d_M)) \times \frac{2g_K + 1/R}{\xi_k^2}$$

Calculate the Side Force at the Lower Stabilizer in the Next Module

When calculating to the next adjacent module, all the segment profiles in that module are functions of the side force at the lower stabilizer of the same module, which is still unknown at this point in the modeling. The side force thus must be calculated before solving the segment profiles.

The side force at the lower stabilizer is a function of the initial segment profiles, the side force of the upper stabilizer, and all the components of the module. To solve the side force, a "recursive procedure" is used. The procedure calls for the process to start now from "the bottom segment in the module" instead of "the top seventy." A set of equations has been derived to solve for the side force. These equations involve a 3-element coefficient array $\{Q_n(3)\}$ (n is the index of the segment). For any module defined as "$S_i$-$X_{k1}$- ... -$B_j$- ... $X_{k2}$-$S_{i+1}$", side force $H'_i$ can be calculated as:

$$H'_i = \frac{D_{i+1} - D_i + P(2)Q_n(1) + P(3)Q_n(2) + \frac{H'_{i+1} Q_n(3)}{\xi_{k2}} + Q_{n-1}(3) + g_{k2} d_{i+1}^2 + \Delta}{d_{i+1} - d_i + \frac{Q_n(3)}{\xi_{k2}}} \quad (7)$$

in which P(3) is the initial segment profile of the module.

Note the array $\{Q_n(3)\}$ is calculated sequentially one segment at a time from the bottom segment to the top segment in the module. The bottom segment is always "S-X," The intermediate segments can be "X-X", "B-X", and "X-B", etc. And the last segment (top) is always "X-S." Note there are no "S-B", "B-S" and "S-S" segment as pseudo cross-overs will be added to simplify the mathematical derivation. The $\{Q_n(3)\}$ for those different segments have been derived and are shown in EQUATIONS (8) to (11).

$S_i \rightarrow X_k$:

$$\begin{bmatrix} Q_n(1) \\ Q_n(2) \end{bmatrix} = F_{k-1} \times F_k \times \begin{bmatrix} \cos(\xi_{k-1} d_i) \\ \sin(\xi_{k-1} d_i) \end{bmatrix} \quad (8)$$

$$Q_n(3) = (F_{k-1} \times E_k + E_{k-1})^T \times \begin{bmatrix} \cos(\xi_{k-1} d_i) \\ \sin(\xi_{k-1} d_i) \end{bmatrix} - XE_k - XE_{k-1}$$

$X_{k-1} \rightarrow X_k, B_j \rightarrow X_k$:

$$\begin{bmatrix} Q_n(1) \\ Q_n(2) \end{bmatrix} = F_{k-1}^T \times \begin{bmatrix} Q_{n-1}(1) \\ Q_{n-1}(2) \end{bmatrix} \quad (9)$$

$$Q_n(3) = E_{k-1}(1) \times Q_{n-1}(1) + E_{k-1}(2) \times Q_{n-1}(2) + Q_{n-1}(3) - XE_{k-1}$$

$X_k \rightarrow B_j$:

$$Q_n = Q_{n-1} \quad (10)$$

$$\Delta = \frac{-Q_n(1)\theta_j \sin(\theta_j \xi_k) + Q_n(2)\theta_j \cos(\theta_j \xi_k)}{\xi_k}$$

$X_i \rightarrow S_k$:

$Q_n(1) = Q_{n-1}(1) - \cos(\xi_k d_i)$ $Q_n(2) = Q_{n-1}(2) - \cos(\xi_k d_i)$ $Q_n(3) = Q_{n-1}(2) \times \cos(\xi_k d_i) - Q_{n-1}(1) \times \sin(\xi_k d_i) \quad (11)$ Once last array $\{Q_n(3)\}$ is obtained in EQUATION (11), the side force at the lower side stabilizer can be solved from EQUATION (7) as all the variables have now been obtained.

Calculate the Segment Profiles

Once the side force at the lower side stabilizer in the module is obtained, the segment profiles in the current module can then be solved. The process will begin from the top segment in the module and move downward one segment at a time until it reaches to the bottom segment in the module. The segment "B-X", "X-X", and "S-X" all have the same profile function. As a result, there are only three sets of segment profiles functions needed to be derived. These functions are shown in EQUATIONS (12) to (14).

$X_k \leftarrow S_i$ segment has the segment profiles:

$$P_n(1) = H'_{i-1}d_i + D_i - g_k d_i^2 - P_{n+1}(2)\cos(\xi_k d_i) - P_{n+1}(3)\sin(\xi_k d_j) \quad (12)$$

$$P_n(2) = P_{n+1}(2) - \frac{(H'_i - H'_{i-1}) \times \sin(\xi_k d_i)}{\xi_k}$$

$$P_n(3) = P_{n+1}(3) + \frac{(H'_i - H'_{i-1}) \times \cos(\xi_k d_i)}{\xi_k}$$

$X_{k-1} \leftarrow X_k$, $B_j \leftarrow X_k$ and $S_i \leftarrow X_k$, segments have the segment profiles.

$$P_n(1) = P_{n+1}(1) - XE_k \quad (13)$$

$$\begin{bmatrix} P_n(2) \\ P_n(3) \end{bmatrix} = F_k \times \begin{bmatrix} P_{n+1}(2) \\ P_{n+1}(2) \end{bmatrix} + E_k$$

$X_k \leftarrow B_j$ segment has the segment profiles:

$$P_n(1) = P_{n+1}(1) \quad (14)$$

$$P_n(2) = P_{n+1}(2) - \frac{\theta_j \sin(\xi_k b_j)}{\xi_k}$$

$$P_n(3) = P_{n+1}(3) + \frac{\theta_j \cos(\xi_k b_j)}{\xi_k}$$

Calculate the Side Force at the Bit and the Segment Profiles in the Bit Module

The side force at the lower stabilizer and the segment profiles for the remaining modules are then calculated until the bottom module, the "Bit Module," is reached, Since the drill bit has different boundary conditions than the intermediate stabilizers, the solutions of the side force at the bit and segment profiles of this module are different from the regular "S-S" modules. It is convenient to classify the "Bit Module" into two categories:

(1) The bit is immediately adjacent to $S_1$ ("Simple Bit Module"); and (2) The bit is not immediately adjacent to $S_1$ ("Complex Bit Module")

For the Simple Bit Module, "Bit-$S_1$", the side force at the bit can be calculated as:

$$H'_0 = \frac{D_1 - P(2)\cos(\xi_0 d_1) - P(3)\sin(\xi_0 d_1) - g_0 d_1^2 + \frac{2g_0}{\xi_0^2}}{d_t} \quad (15)$$

For the Complex bit module, the side force at the bit has been derived as:

$$H_0 = \frac{D_1 - P(2)\cos(\xi_k d_1) - P(3)\sin(\xi_k d_1) - g_k d_1^2 + \frac{2g_0}{\xi_0^2} + \sum_{i=1}^{k} XE_i}{d_1} \quad (16)$$

in which P(3) is the initial segment profile. The segment profiles in the bit module can be solved using EQUATIONS (12) to (14) after $H'_0$ is obtained.

Calculate the Second Nonlinear Equation

The second non-linear equation $\phi$ can be obtained after $H'_0$ is calculated. Similar to the equations of $H'_0$, there are two scenarios for this equation:

Simple Bit Module:

$$\phi = \frac{\xi_0 P_1(1) - \frac{2g_0}{\xi_0^2}}{\sin(\xi_0 d_1)} + H'_0 - H'_1 \quad (17)$$

Complex Bit Module:

$$\phi = P_1(1) - \frac{2g_0}{\xi_0^2} \quad (18)$$

Figure 5:
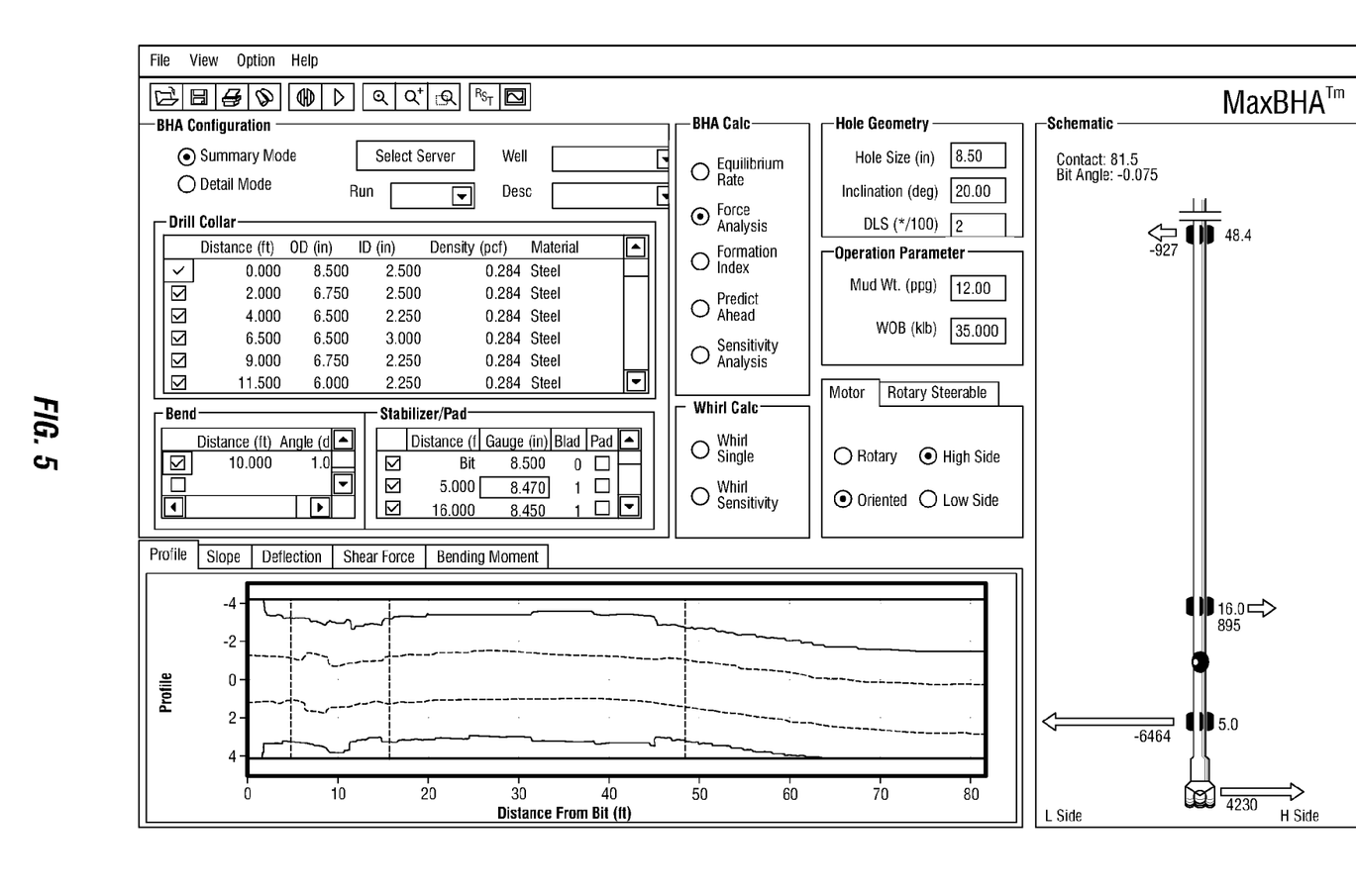
FIG. 5 is a user interface for a computer system for modeling a BHA in accordance with the flow chart illustrated in FIG. 3 that shows the BHA force analysis results for the BHA modeled in FIG. 4.

When the two nonlinear equations, $\gamma$ and $\phi$, are obtained, the two unknowns: Tangential point location (L) and the side force at the top stabilizer ($H'_M$) can be solved by numerical iteration to complete the model of the BHA. When the iteration converges and two unknowns (L and $H'_M$) are solved, all the side forces and segment profiles can be obtained. This, in turn, completes the solutions for the entire BHA. The results may then be displayed for assembly of the BHA for drilling the wellbore such as illustrated in FIG. 5.

Validate the Results with Stabilizer Deflection

The boundary conditions at the stabilizers may be checked by comparing the direction of the deflection with the directional of the side forces. If there is any violation at the stabilizers, the stabilizer deflections may be changed and the model calculations performed again until the model produces a valid result.

Wellbore Contact

Collars and wellbore wall contact may be a very common issue in the BHA analysis. The deflection profile of the entire BHA may therefore be checked to see if the deflection exceeds the wellbore clearance. If this occurs, a pseudo-stabilizer (with a gauge same as the collar OD) can be added into the BHA model at the maximum deflection point to bring the deflected BHA back inside the wellbore. Sometimes multiple pseudo-stabilizers maybe needed for a severe deflection.

Validating the results with stabilizer deflection and wellbore contact taken into account may not produce desirable results for the modeled BHA configuration. The assumptions made in building the model may then need to be modified. In addition, where these assumptions are in the form of quantifiable parameters, a log could be produced of the assumptions vs. depth. The log might then be used for diagnostic purposes in drilling the well, e.g., as in estimating bit weal.

Thus, the model used is self-structuring to transform any BHA model into two nonlinear equations associated with two unknowns. The two unknowns are then solved by iteration. The overall calculation may thus be summarized and illustrated using the exemplary BHA in FIG. 4:

Initialization, calculate cross-over coefficients $F_i$, $E_i$, $XE_i$;

Calculate $1^{st}$ nonlinear equation γ and top segment profiles

Calculate side force $H'_2$ and segment profiles in the module $S_2$-$X_7$-$X_8$-$S_3$ Calculate side force $H'_1$ and segment profiles in module $S_1$-$X_3$-$X_4$-$B_1$-$X_5$-$X_6$-$S_2$ Calculate bit side force $H'_0$ and segment profiles in the module Bit-$X_1$-$X_2$-$S_1$ Calculate $2^{nd}$ nonlinear equation φ

Check converge status. If not, go back to step 1

Check stabilizer deflection. If violation, restart from step 1

Using the model as described above, a computer system running software may perform the modeling calculations. Because the unknowns are reduced to only two, the iteration process is robust and extremely computationally efficient. Therefore, the BHA may be modeled in "real-time" at a rig site on the surface or downhole. For example, before drilling a well, an initial plan is created for the trajectory of the well. In doing so, the BHA model is used to design the BHA as described above. The expected build rate as a function of measured depth is estimated from the planned trajectory of the well and the designed BHA. The well is then drilled with the designed BHA and the build rate is measured as a function of measured depth. As the well is being drilled, the measured build rate at a given depth is compared with the expected build rate at that depth from the initial well plan. If the measured build rate differs from the expected build rate at that depth by more than an acceptable amount, changes may be made. The changes may include removing the BHA from the wellbore and re-designing the configuration using the model described above. The changes may also include revising the drilling parameters and/or the operating parameters of the steerable tool based on the measured build rate at that depth. The measured build rate may be obtained by any suitable means know to one of ordinary skill in the alt, e.g., surveying the borehole with survey equipment. The survey data may then be transmitted to the surface for analysis using any suitable telemetry system and/or method, e.g., a mud pulse or wired pipe telemetry system. Alternatively, the survey data may be analyzed downhole using a processor located in the BHA itself. The processor may then use the survey data to actuate downhole controllers to revise the drilling parameters and/or the operating parameters of the steerable tool.

Although aspects of the present invention are described as being stored in memory, one skilled in the art will appreciate that these aspects can also be stored on or read from other types of computer-readable media, such as secondary storage devices, like hard disks, floppy disks, or CD-ROMs; or other forms of RAM or ROM. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention. Also, each user of a particular computer will be aware of the language and tools which are most useful for that user's needs and purposes.

Verifications Against Field Data and FEM Programs

The following examples illustrate the use of the model in designing the configuration of a BHA for use with a steerable motor and a point-the-bit rotary steerable system. However, it should also be appreciated that the model may be used for a BHA for use with a system using both a steerable motor and a point-the-bit rotary steerable system.

Example #1

Steerable Motor

Figure 6:
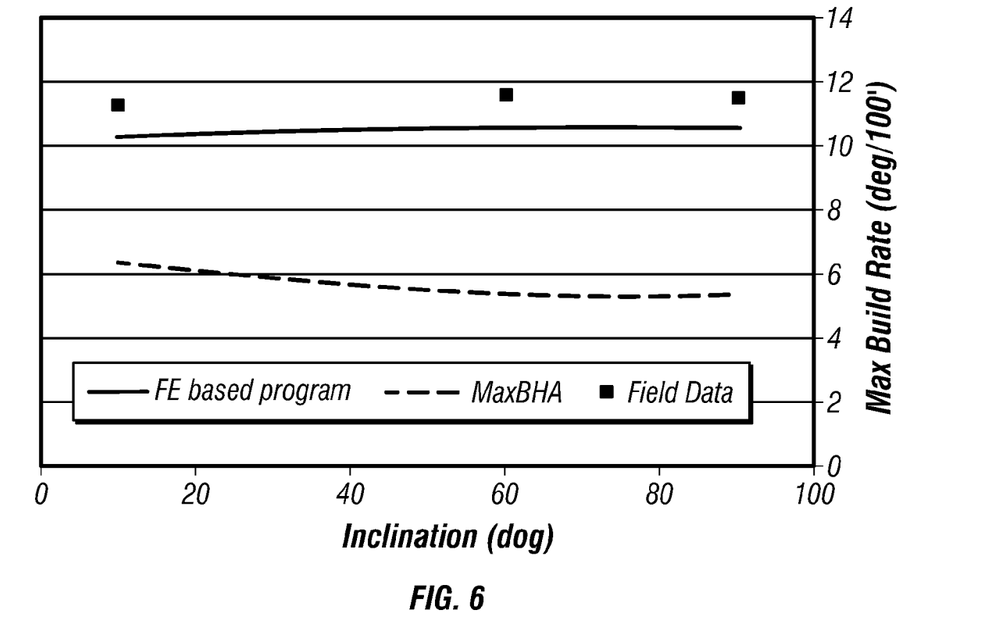
FIG. 6 is a chart comparing modeling results versus field data for the maximum build rate of a steerable drilling system BHA for a steerable motor system.

A steerable motor assembly includes an 8½-in. PDC bit, a 6¼-in. motor with a 1.5 deg. bend, 6½-in. drill collars, and three stabilizers. The gauge and location of the three stabilizers are: 8.45-in (1.25 feet), 8.25-in. (7.25 feet) and 8.25-in. (33.8 feet). The steerable motor was used to kick off from vertical. As illustrated in the chart of FIG. 6, the maximum build rate seen from the survey was consistently around 11.5 deg/100-ft. Using the method described above, the model predicted a maximum build rate of about 10.8 deg/100-ft while the commercial FE based BHA program predicts a maximum build rate of less than 6 deg/100-ft.

Example #2

Point-the-Bit Rotary Steerable System Assembly

Figure 7:
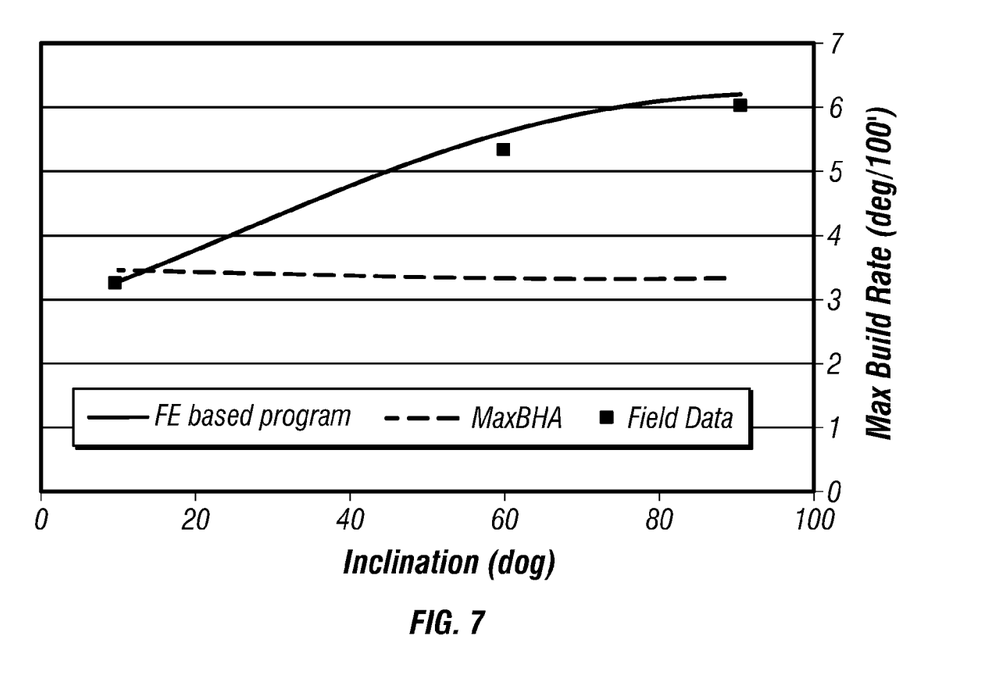
FIG. 7 is a chart comparing modeling results versus field data for the maximum build rate of a steerable drilling system BHA for a point-the-bit rotary steerable system.

A point-the-bit rotary steerable system (RSS) was used to kick off from vertical in another well. As illustrated in FIG. 7, the build rate of the RSS is seen as increasing with the inclination from both field data and using the method described above. Although the finite element program predicts the build rate well at low inclinations, it fails to predict the trend of increased build rate.

While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

What is claimed is:

1. A method of designing the configuration of a bottom hole assembly including components that include at least one stabilizer, the bottom hole assembly being connected with a drill string that also includes a drill bit, the method including:

modeling the bottom hole assembly configuration using Lubinski's bottom hole assembly equations by dividing the bottom hole assembly components into modules and segments such that the bottom hole assembly is characterized by not more than two nonlinear equations associated with two unknowns, wherein the modeling comprises:

calculating profiles of the segments in a first, upper module;

determining a first non-linear equation for a first segment that solves for a distance between the drill bit and a tangential point;

calculating a side force at a lower stabilizer in another of any additional modules;

calculating profiles of the segments of another of any additional modules;

calculating a side force at a lower stabilizer and profiles of the segments for remaining modules except a last, bit module;

calculating a side force at the drill bit;

calculating profiles of the segments in the bit module;

determining a second nonlinear equation for a bit segment that solves for a side force at an upper stabilizer; and calculating a distance between the drill bit and a tangential point and a side force at the upper stabilizer using the first and second non-linear equations;
resolving the unknowns by iteration to determine the bottom hole assembly configuration; and
displaying the bottom hole assembly configuration.

2. The method of claim 1 further including:
determining boundary conditions at the stabilizers by comparing the direction of a deflection with the direction of the side forces; and
verifying that a wellbore clearance is greater than a deflection profile of the bottom hole assembly.

3. The method of claim 2 further including repeating the modeling the configuration of the components based on a revised set of assumptions.

4. The method of claim 1, further including designing the configuration of the bottom hole assembly in real time while at a wellbore drilling location.

5. A method of drilling a wellbore with a steerable tool and a drill bit including:
planning a well trajectory including an expected build rate as a function of measured depth;
determining components for a bottom hole assembly, the components including at least one stabilizer;
designing a configuration of the bottom hole assembly, including:
modeling the bottom hole assembly configuration using Lubinski's bottom hole assembly equations by dividing the bottom hole assembly components into modules and segments such that the bottom hole assembly is characterized by not more than two nonlinear equations associated with two unknowns, wherein the modeling comprises:
calculating profiles of the segments in the upper module;
determining a first non-linear equation for a first segment that solves for a distance between the bit and a tangential point;
calculating a side force at a lower stabilizer in another of any additional modules;
calculating profiles of the segments of another of any additional modules;
calculate a side force at a lower stabilizer and profiles of the segments for remaining modules except a last, bit module;
calculating a side force at the drill bit;
calculating profiles of the segments in the bit module;
determining a second nonlinear equation for a bit segment that solves for a side force at an upper stabilizer; and
calculating a distance between the drill bit and a tangential point and a side force at the upper stabilizer using the first and second non-linear equations; and
resolving the unknowns by iteration to determine the bottom hole assembly configuration;
drilling the wellbore using the bottom hole assembly configuration;
measuring a measured build rate as a function of measured depth; and
comparing the measured build rate with the expected build rate.

6. The method of claim 5 further including revising at least one drilling or operating parameter of the steerable tool as a function of measured depth based on the measured build rate.

7. The method of claim 6 wherein comparing the measured build rate with the expected build rate and revising at least one drilling parameter or operating parameter of the steerable tool are performed using a downhole processor.

8. The method of claim 5 further including:
determining boundary conditions at the stabilizers by comparing the direction of a deflection with the direction of the side forces; and
verifying that a wellbore clearance is greater than a deflection profile of the bottom hole assembly.

9. The method of claim 8 further including repeating the modeling the configuration of the components based on a revised set of assumptions.

10. The method of claim 9 further comprising logging the set of assumptions as a function of depth in drilling the wellbore.

11. The method of claim 5, further including designing the configuration of a bottom hole assembly in real time while at a wellbore drilling location.

12. A computer-readable medium including software that, when executed by a processor causes the processor to design a configuration of a bottom hole assembly including components that include at least one stabilizer, the bottom hole assembly being connected with a drill string that also includes a drill bit, the designing including:
modeling the bottom hole assembly configuration using Lubinski's bottom hole assembly equations by dividing the bottom hole assembly components into modules and segments such that the bottom hole assembly is characterized by not more than two nonlinear equations associated with two unknowns, whereing the modeling comprises:
calculating profiles of the segments in a first, upper module;
determining a first non-linear equation for a first segment that solves for a distance between the drill bit and a tangential point;
calculating a side force at a lower stabilizer in another of any additional modules;
calculating profiles of segments of another of any additional modules;
calculating a side force at a lower stabilizer and profiles of the segments for remaining modules except a last, bit module;
calculating a side force at the drill bit;
calculating profiles of segments in the bit module;
determining a second nonlinear equation for a bit segment that solves for a side force at an upper stabilizer; and
calculating a distance between the drill bit and a tangential point and a side force at the upper stabilizer using the first and second non-linear equations; and
resolving the unknowns by iteration to determine the bottom hole assembly configuration.

13. The computer-readable medium of claim 12 modeling the bottom hole assembly configuration further includes:
determining boundary conditions at the stabilizers by comparing the direction of a deflection with the direction of the side forces; and
verifying that a wellbore clearance is greater than a deflection profile of the bottom hole assembly.

14. The computer-readable medium of claim 13, further including repeating the modeling of the configuration of the components based on a revised set of assumptions.

15. The computer-readable medium of claim 12, wherein the design of the configuration of a bottom hole assembly is performable in real time while at a wellbore drilling location.

* * * * *